(12) United States Patent
Ensign et al.

(10) Patent No.: US 11,169,550 B2
(45) Date of Patent: Nov. 9, 2021

(54) EXTERNALLY ADJUSTABLE PRESSURE REGULATOR

(71) Applicant: Pressure Specialist, Inc., Crystal Lake, IL (US)

(72) Inventors: Jacob Ensign, Rogue River, OR (US); Travis Whitney, Mt. Shasta, CA (US)

(73) Assignee: Pressure Specialist, Inc., Crystal Lake, IL (US)

(*) Notice: Subject to any disclaimer, the term of this patent is extended or adjusted under 35 U.S.C. 154(b) by 0 days.

(21) Appl. No.: 17/084,897

(22) Filed: Oct. 30, 2020

(65) Prior Publication Data
US 2021/0132639 A1    May 6, 2021

Related U.S. Application Data

(60) Provisional application No. 62/927,793, filed on Oct. 30, 2019.

(51) Int. Cl.
*F16K 31/12* (2006.01)
*G05D 16/10* (2006.01)

(52) U.S. Cl.
CPC ......... *G05D 16/103* (2013.01); *G05D 16/107* (2019.01); *Y10T 137/7808* (2015.04)

(58) Field of Classification Search
CPC ............................................. Y10T 137/7808
See application file for complete search history.

(56) References Cited

U.S. PATENT DOCUMENTS

| | | | | |
|---|---|---|---|---|
| 399,548 | A | * 3/1889 | Nageldinger | G05D 16/0608 137/505.25 |
| 614,441 | A | * 11/1898 | Burnett | G05D 16/103 137/505.25 |
| 2,615,287 | A | 10/1952 | Senesky | |
| 2,918,081 | A | 12/1959 | Lauer, Jr. | |
| 3,474,822 | A | 10/1969 | Kuhn | |
| 3,698,425 | A | * 10/1972 | Fisher | B63C 11/2209 137/505.25 |
| 3,848,631 | A | 11/1974 | Fallon | |
| 3,890,999 | A | 6/1975 | Moskow | |
| 3,926,208 | A | 12/1975 | Hoffman | |
| 4,064,890 | A | 12/1977 | Collins | |
| 4,181,139 | A | 1/1980 | Martini | |
| 4,194,522 | A | 3/1980 | Lucas | |
| 4,226,257 | A | 10/1980 | Trinkwalder | |

(Continued)

*Primary Examiner* — Robert K Arundale
(74) *Attorney, Agent, or Firm* — Levenfeld Pearlstein, LLC

(57) ABSTRACT

An externally adjustable pressure regulator includes a body having a shoulder, a longitudinal axis and a high pressure inlet. The body has an opening along a side. A bonnet has a regulated pressure outlet and is engaged with the body. A piston is positioned in part in the body and the bonnet. The piston has a shoulder, a longitudinal bore and a transverse bore at about the end thereof in flow communication with the longitudinal bore. A spring is disposed on the piston. A wedging element is positioned in the opening in the body side and is in contact with the spring. An adjusting ring engages the wedging element to move it into the spring to increase compression of the spring and off of the spring to decrease compression. Increasing compression of the spring increases a spring force of the spring on the piston and decreasing compression of the spring decreases the spring force on the piston.

11 Claims, 1 Drawing Sheet

(56) References Cited

U.S. PATENT DOCUMENTS

| | | | |
|---|---|---|---|
| 4,305,423 A | 12/1981 | Adler | |
| 4,450,858 A | 5/1984 | Acomb | |
| 4,648,431 A | 3/1987 | Stronger | |
| 4,785,847 A | 11/1988 | Steer | |
| 4,924,904 A * | 5/1990 | Carter | G05D 16/103 137/505.11 |
| 5,086,807 A | 2/1992 | Lasnier | |
| 5,123,442 A | 6/1992 | Geuy | |
| 5,234,026 A | 8/1993 | Patterson | |
| 5,280,778 A | 1/1994 | Kotsiopoulos | |
| 5,368,022 A | 11/1994 | Wagner | |
| 5,392,825 A | 2/1995 | Mims | |
| 5,396,918 A * | 3/1995 | Parker | G05D 16/0608 137/14 |
| 5,411,053 A | 5/1995 | Markham | |
| 5,522,421 A | 6/1996 | Holt | |
| 5,669,369 A | 9/1997 | Scott | |
| 2005/0121083 A1* | 6/2005 | Carroll | G05D 16/103 137/505.25 |
| 2007/0209703 A1* | 9/2007 | Neumann | G05D 16/106 137/102 |

* cited by examiner

EXTERNALLY ADJUSTABLE PRESSURE REGULATOR

BACKGROUND

The present disclosure relates to an externally adjustable fluid pressure regulator, and more particularly, to an externally adjustable pressure regulator that can be adjusted without disassembly of the regulator.

Pressure regulators are used in many fields, including in air rifles, industrial applications, and the transportation field. Plunger type regulators are a straight-forward and efficient devices to continuously regulate an output or working pressure. Collinear regulators, those in which the inlet and the outlet share a common axis, do not allow for adjusting the output pressure without out discharging the internal pressure, and disassembling the regulator to make the required adjustments.

Accordingly, there is a need for a straight-forward and efficient pressure regulator the permits the output pressure to be adjusted from an external element on the regulator, and without disassembling the regulator to makes such adjustments.

SUMMARY

In one aspect, an externally adjustable pressure regulator, comprising includes a body having a shoulder, a longitudinal axis and a high pressure inlet. The has an opening therein along a side of the regulator.

A bonnet is engaged with the body. The bonnet has a regulated pressure outlet. The body and bonnet can be threadedly engaged with each other.

A piston is positioned at least in part in the body and at least in part in the bonnet. The piston has a shoulder, a longitudinal bore and a transverse bore at about the end thereof. The transverse bore is in flow communication with the longitudinal bore. A spring is disposed on the piston, The spring can be, for example, a coil spring.

A wedging element is positioned in the opening in the body side and is in contact with the spring. In embodiments, the regulator includes multiple wedging elements. In embodiments, the wedging elements are balls.

An adjusting ring engages the wedging elements to move the wedging elements into the spring to increase compression of the spring and to move the wedging elements off of the spring to decrease compression of the spring. The adjusting ring can be configured with an angled surface to cooperate with the wedging elements. In embodiments, the adjusting ring is threadedly engaged with the body.

Increasing compression of the spring increases a spring force of the spring on the piston and decreasing compression of the spring decreases the spring force of the spring on the piston.

In embodiments, the body includes a seat and the piston includes a sealing element engageable with the seat. The piston can includes a shoulder such that the spring is positioned on the piston against the shoulder.

Further understanding of the present disclosure can be obtained by reference to the following detailed description in conjunction with the associated drawings, which are described briefly below.

DESCRIPTION OF THE DRAWINGS

Various embodiments of an externally adjustable pressure regulator are disclosed as examples and are not limited by the figures of the accompanying drawings, in which like references may indicate similar elements and in which.

DETAILED DESCRIPTION

Figure 1:
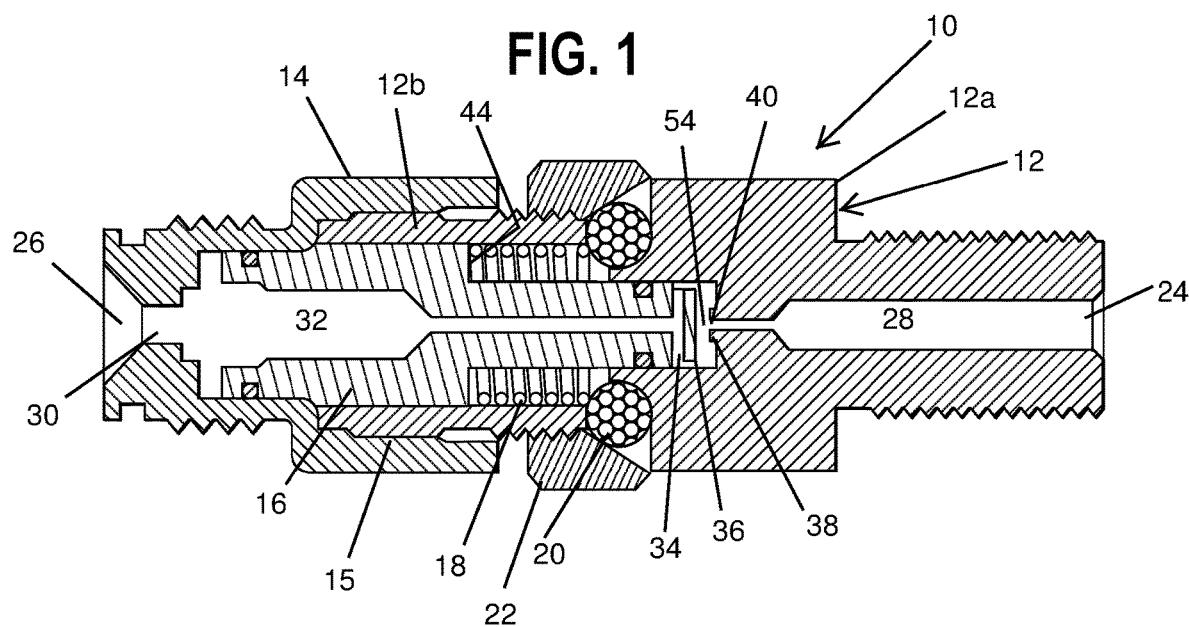
FIG. 1 is across-sectional illustration of an embodiment of an externally adjustable pressure regulator in an open state.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

An externally adjustable pressure regulator 10 permits adjusting an output pressure of the regulator 10 from an external element on the regulator 10, without disassembling the regulator 10 to makes such adjustments. As seen in the figures, the regulator can be a linear or collinear device.

The regulator 10 includes a body 12, a bonnet 14, a plunger or piston 16, a spring 18, a force manipulator or wedging element 20 and an adjusting element 22. In an embodiment the spring 18 can be a coil spring as illustrated, spring washers and the like, and the adjusting element 22 can be, for example, an adjusting ring.

The regulator 10 includes a high pressure (or unregulated pressure) inlet 24 and a low pressure (or regulated pressure) outlet 26. The body 12 and bonnet 14 define respective bores 28, 30 therethrough. The body 12 and bonnet 14 can be threadedly engaged with one another as illustrated at 15. A longitudinal bore 32 is formed, in part, in the piston 16. The piston 16 can include transverse openings or bores 34 at about an end thereof that are in flow communication with the piston bore 32.

A sealing element 36 is disposed at about an end of the piston 16 and cooperates with a seat 38 in the body 12. The seat 38 can be formed as part of the body 12 or can be an element that is positioned in the body 12. The seat 38 may be removable to, for example replace the seat 38. One or both of the seat 38 and sealing element 36 can be formed from a resilient material such as a polymeric material. The other of the seat 38 and the sealing element 36 may be formed from a rigid material, such as a metal. In some embodiments the seat 38 is formed as part of the body 12. An orifice 40 is defined by or at the seat 38.

Figure 2:
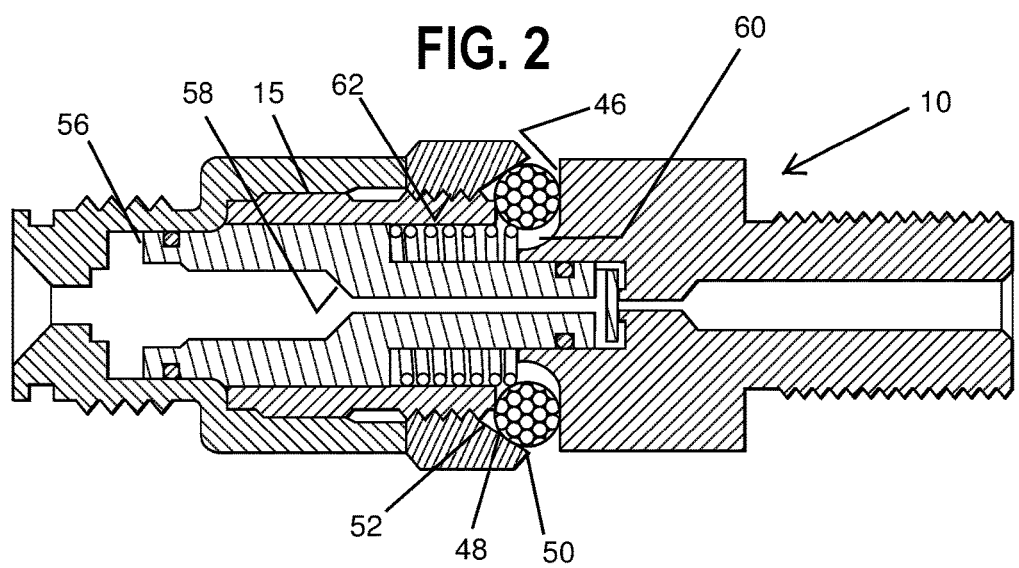
FIG. 2 is cross-sectional illustration of the externally adjustable pressure regulator of FIG. 1 shown in a closed state.

The piston 18 moves within the body 12 between an open state as seen in FIG. 1 in which the sealing element 36 is spaced from the seat 38 and a closed state as seen in FIG. 2 in which the sealing element 36 is engaged with (or seated on) the seat 38. The spring 18, which is positioned in the body 12, between the body 12 and the piston 18, urges the regulator 10 to the open state. The spring 18 rests on a shoulder 44 of the piston 16.

The force manipulator or wedging elements 20 are positioned against a shoulder 46 on the body 12 and in contact with the spring 18, captured in the regulator by the adjusting ring 22. The shoulder 46 serves as a fixed surface against which the wedging elements 20 act. Referring to FIG. 1, as the wedging elements 20 are urged inward of or toward the body 12, they contact and urge the spring 18 to a compressed state. Conversely as the wedging elements 20 are moved outward from the body 12, they allow the spring 18 to expand. Movement of the wedging elements 20 inward and outward (or into and out of contact with the spring 18) can be accomplished by the adjusting element 22, e.g., the illustrated adjusting ring.

In an embodiment, the adjusting ring 22 includes an angled surface 48 having a larger diameter region 50 and a smaller diameter region 52. As the ring 22 is moved such that the smaller diameter region 52 engages the wedging elements 20 (FIG. 1), the ring 22 urges the wedging elements 20 inward to compress the spring 18. Conversely, as the ring 22 is moved such that the larger diameter region 50 engages the wedging elements 20 (FIG. 2), the ring 22 allows the wedging elements 20 to move outwardly which in turn allows the spring 18 to expand.

It will be appreciated that compressing the spring 18 increases the spring force and conversely allowing the spring 18 to expand reduces the spring force. In addition, as the ring 22 is moved to urge the wedging elements 20 inward to compress the spring 18, the spring 18 force that is exerted also influences the piston 16, that is, it moves the piston 18 to a further open condition (moves the piston to the left in the figures).

In operation or use, a high pressure or unregulated pressure fluid, such as an unregulated compressed gas such as compressed air source is connected to the inlet 24. The gas flows into the inlet 24 and through the orifice 40 into a region 54 between the orifice 40 and the piston 16. It will be appreciated that the width of the piston 16 at the sealing element 36 is smaller than the width of the body bore 28 so that the gas can flow around the sealing element 36, into the piston transverse bores 34 and into the piston longitudinal bore 32.

The gas flows through the piston longitudinal bore 32 and out through the low pressure or regulated pressure outlet 26. As the gas pressure at the outlet 26 increases, it induces a force on the piston 16 (at the piston back face 56 and interior 58). When the pressure increases to a level at which the force on the piston 16 (created by the gas pressure) overcomes the spring 18 force, the piston 16 moves to the right (as seen in the figures) to close the regulator 10 (FIG. 2). Conversely, when the pressure in the low pressure side (outlet 26) decreases, the force on the piston 16 decreases and the spring force urges the piston 16 to the left to open the regulator 10 (FIG. 1).

Adjustability of the regulator 10 is accomplished by moving the adjusting ring 22 so as to urge the wedging elements 20 inward (to compress the spring 18) and increase the outlet pressure, or to move the wedging elements 20 outward to allow the spring 18 to expand and decrease the outlet pressure.

It will be appreciated, the adjusting ring 22 can be a ring that threadedly engages with the body 12 (as seen at 62) such that rotation of the ring 22 facilitates regulator 10 adjustment. It will also be appreciated that the wedging elements 22 can take many forms, such as angled wedge surfaces, balls and the like that can be positioned in openings 60 at various circumferential locations around the body 12. It will also be understood that although the body 12 is illustrated as two separate parts in the figures (see FIG. 1 reference numbers 12a, 12b), the body 12 is a single part with the body 12 being contiguous other than at those locations (the openings 60) at which the wedging elements 22 (such as the balls) are positioned in the body openings 60.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. An externally adjustable pressure regulator, comprising:
    a body having a shoulder, a longitudinal axis and having a high pressure inlet, the body having an opening therein along a side thereof;
    a bonnet engaged with the body, the bonnet having a regulated pressure outlet;
    a piston positioned at least in part in the body and at least in part in the bonnet, the piston having a shoulder, the piston having a longitudinal bore and a transverse bore at about the end thereof, the transverse bore in flow communication with the longitudinal bore;
    a spring disposed on the piston;
    a wedging element, the wedging element positioned in the opening in the body side and in contact with the spring; and
    an adjusting ring, the adjusting ring engaging the wedging element to move the wedging element into the spring to increase compression of the spring and to move the wedging element off of the spring to decrease compression of the spring,
    wherein increasing compression of the spring increases a spring force of the spring on the piston and decreasing compression of the spring decreases the spring force of the spring on the piston.

2. The pressure regulator of claim 1, wherein the body and bonnet are threadedly engaged with one another.

3. The pressure regulator of claim 1, wherein the adjusting ring is threadedly engaged with the body.

4. The pressure regulator of claim 1, including a plurality of wedging elements.

5. The pressure regulator of claim 4, wherein the wedging elements are balls.

6. The pressure regulator of claim 1, wherein the body includes a seat and the piston includes a sealing element engageable with the seat.

7. The pressure regulator of claim 1, wherein the adjusting ring includes an angled surface for engaging the wedging element.

8. The pressure regulator of claim 5, wherein the adjusting ring includes an angled surface for engaging the balls.

9. The pressure regulator of claim 1, wherein the spring is disposed on the piston.

10. The pressure regulator of claim 1, wherein the spring is coil spring.

11. The pressure regulator of claim 1 wherein the piston includes a shoulder and wherein the spring is positioned on the piston against the shoulder.

* * * * *